US 8,418,316 B2

(12) United States Patent
Chen

(10) Patent No.: US 8,418,316 B2
(45) Date of Patent: Apr. 16, 2013

(54) FRICTION WHEEL FOR CART

(75) Inventor: Ching-Tsun Chen, Yuanlin Township, Changhua County (TW)

(73) Assignee: Der Sheng Co., Ltd., Changhua County (TW)

( * ) Notice: Subject to any disclaimer, the term of this patent is extended or adjusted under 35 U.S.C. 154(b) by 0 days.

(21) Appl. No.: 13/212,235

(22) Filed: Aug. 18, 2011

(65) Prior Publication Data

US 2013/0042430 A1 Feb. 21, 2013

(51) Int. Cl.
*A47B 91/00* (2006.01)
*B60B 33/00* (2006.01)

(52) U.S. Cl.
USPC .............. 16/45; 16/18 R; 16/46; 474/197; 474/199; 301/5.305; 301/5.309; 188/68

(58) Field of Classification Search .......... 16/35 R, 16/35 D, 45, 18 R, 46, 47, 48, 2.1, 2.2, 2.5; 308/190, 191; 403/365, 383; 301/5.301, 301/5.7, 5.305, 5.309; 188/1.12, 17, 26, 188/68; 474/197, 199; 384/416, 417, 418, 384/419
See application file for complete search history.

(56) References Cited

U.S. PATENT DOCUMENTS

| | | | | |
|---|---|---|---|---|
| 698,110 A * | 4/1902 | Foy | ............................. | 301/5.301 |
| 2,034,948 A * | 3/1936 | Knapp | ............................ | 301/5.7 |
| 2,105,354 A * | 1/1938 | Hoerle | ........................... | 384/544 |
| 2,871,061 A * | 1/1959 | Behm et al. | ................. | 301/5.307 |
| 4,006,993 A * | 2/1977 | Woerlee | ..................... | 403/359.5 |
| 4,218,098 A * | 8/1980 | Burton | ............................ | 301/5.7 |
| 4,318,204 A * | 3/1982 | Black | ............................... | 16/46 |
| 4,348,785 A * | 9/1982 | Jordan | .............................. | 16/46 |
| 4,372,435 A * | 2/1983 | Bradbury | ................... | 198/369.4 |
| 4,427,310 A * | 1/1984 | Middleton | .................... | 384/415 |
| 4,592,595 A * | 6/1986 | Freeman | .................... | 301/5.308 |
| 4,633,544 A * | 1/1987 | Hicks | ............................ | 16/35 R |
| 4,679,662 A * | 7/1987 | Nordskog | .................... | 188/1.12 |
| 4,898,403 A * | 2/1990 | Johnson | ........................ | 280/842 |
| 4,979,262 A * | 12/1990 | Lautenschlager | ................. | 16/97 |
| 5,002,163 A * | 3/1991 | Kidd | ............................... | 188/83 |
| 5,068,956 A * | 12/1991 | Malewicz | ....................... | 29/437 |
| 5,178,472 A * | 1/1993 | Lawson | ......................... | 384/537 |
| 5,275,472 A * | 1/1994 | Hicks | ........................ | 301/105.1 |
| 5,275,473 A * | 1/1994 | Hicks | ........................ | 301/105.1 |
| 5,448,944 A * | 9/1995 | Line et al. | ....................... | 100/88 |
| 5,468,070 A * | 11/1995 | Riedel et al. | .................. | 384/127 |
| 5,482,383 A * | 1/1996 | Gantt et al. | ................... | 384/513 |
| 5,518,322 A * | 5/1996 | Hicks | ............................ | 384/544 |
| 5,564,790 A * | 10/1996 | Lekavich | ................... | 301/5.306 |
| 5,590,935 A * | 1/1997 | McAllister | ................. | 301/37.11 |
| 5,597,135 A * | 1/1997 | Vandersteene | ............. | 242/599.4 |
| 5,660,447 A * | 8/1997 | Angelici | ....................... | 301/5.7 |

(Continued)

*Primary Examiner* — Victor Batson
*Assistant Examiner* — Jason W San
(74) *Attorney, Agent, or Firm* — Alan Kamrath; Kamrath IP Lawfirm, P.A.

(57) ABSTRACT

A friction wheel includes a hub, two bearings mounted in the hub and each having an axle, and a friction member mounted between the hub and the axle of each of the two bearings. Thus, the friction member is mounted between the hub and the axle of each of the two bearings to increase the friction between the hub and the axle of each of the two bearings so that the user has to apply a larger force to overcome the friction between the hub and the axle of each of the two bearings so as to move the cart forward, thereby preventing the cart from being moved freely.

12 Claims, 6 Drawing Sheets

U.S. PATENT DOCUMENTS

| | | | | |
|---|---|---|---|---|
| 5,667,280 A * | 9/1997 | Hansen | | 301/5.307 |
| 5,690,395 A * | 11/1997 | Hicks | | 301/105.1 |
| 5,810,504 A * | 9/1998 | Rabinovich | | 403/371 |
| 5,813,090 A * | 9/1998 | Miles | | 16/37 |
| 5,871,286 A * | 2/1999 | Kern et al. | | 384/280 |
| 5,884,923 A * | 3/1999 | Pratt | | 280/11.221 |
| 5,941,539 A * | 8/1999 | Pratt | | 280/11.27 |
| 6,065,760 A * | 5/2000 | Weygandt | | 280/11.19 |
| 6,070,701 A * | 6/2000 | Hu | | 188/1.12 |
| 6,106,441 A * | 8/2000 | Chen | | 482/57 |
| 6,170,837 B1 * | 1/2001 | Ross | | 280/1 |
| 6,398,395 B1 * | 6/2002 | Hyun | | 362/500 |
| 6,494,622 B2 * | 12/2002 | Plesh, Sr. | | 384/542 |
| 6,612,658 B1 * | 9/2003 | Oumedian | | 301/111.06 |
| 6,619,823 B2 * | 9/2003 | Dai | | 362/500 |
| 6,698,060 B1 * | 3/2004 | Lee | | 16/20 |
| 6,834,746 B1 * | 12/2004 | Lin | | 188/1.12 |
| 7,011,317 B1 * | 3/2006 | Hicks et al. | | 280/33.991 |
| 7,406,989 B1 * | 8/2008 | Casaus | | 152/323 |
| 7,516,512 B2 * | 4/2009 | Tsai | | 16/35 R |
| 7,540,570 B2 * | 6/2009 | Lund | | 301/110.5 |
| 7,647,673 B2 * | 1/2010 | Melara | | 16/35 R |
| 7,725,986 B2 * | 6/2010 | Tsai | | 16/46 |
| 7,878,600 B2 * | 2/2011 | Krantz | | 301/5.306 |
| 2002/0105169 A1 * | 8/2002 | Dahl | | 280/651 |
| 2002/0171213 A1 * | 11/2002 | Kim | | 280/47.26 |
| 2003/0178886 A1 * | 9/2003 | Gorza et al. | | 301/5.309 |
| 2004/0006844 A1 * | 1/2004 | Modlhammer | | 16/18 R |
| 2004/0235599 A1 * | 11/2004 | Ozorak et al. | | 474/199 |
| 2006/0249320 A1 * | 11/2006 | Carter et al. | | 180/65.5 |
| 2007/0120416 A1 * | 5/2007 | Pusch et al. | | 301/64.304 |
| 2008/0246330 A1 * | 10/2008 | Roderick et al. | | 301/5.307 |
| 2009/0097790 A1 * | 4/2009 | Hidano et al. | | 384/418 |
| 2010/0299869 A1 * | 12/2010 | Von Bordelius et al. | | 16/45 |
| 2011/0203074 A1 * | 8/2011 | Trivini | | 16/45 |

* cited by examiner

FRICTION WHEEL FOR CART

BACKGROUND OF THE INVENTION

1. Field of the Invention

The present invention relates to a wheel and, more particularly, to a friction wheel for a cart, such as a shopping cart and the like.

2. Description of the Related Art

A conventional cart comprises a skeleton, a plurality of wheel brackets swivelably mounted on the bottom of the skeleton, a plurality of wheels rotatably mounted on the wheel brackets by a plurality of screw members, and a plurality of bearings mounted between the wheel brackets and the wheels. Thus, the wheels are rotated freely to facilitate a user moving the cart. However, a little friction is produced between the bearings and the wheels so that the cart is easily moved due to a slope of the ground or due to a slight touch or push by a person unintentionally, thereby causing inconvenience or danger to the user. In addition, when the cart bears a heavy load, movement of the cart cannot be stopped immediately due to the heavy load so that it takes a longer time to stop the cart, thereby easily causing a collision with other carts.

BRIEF SUMMARY OF THE INVENTION

In accordance with the present invention, there is provided a friction wheel, comprising a hub, two bearings mounted in the hub and each having an axle, and a friction member mounted between the hub and the axle of each of the two bearings. The hub has a central portion provided with a mounting hole for mounting the friction member and the two bearings. The mounting hole of the hub has a mediate portion provided with a noncircular limit portion mounted on the friction member. The friction member has a periphery provided with a noncircular limit section limited in the limit portion of the hub so that the friction member is non-rotatable relative to and rotatable in concert with the hub. The friction member has an interior provided with an axle hole to receive the axle of each of the two bearings. The axle hole of the friction member has a peripheral wall provided with a plurality of pressing pieces abutting the axle of each of the two bearings and a plurality of pressing ribs abutting the axle of each of the two bearings. The friction wheel further comprises two covers mounted on the hub to cover the two bearings and the axle of each of the two bearings.

The primary objective of the present invention is to provide a friction wheel that provides a resistance to movement of a cart.

According to the primary advantage of the present invention, the friction member is mounted between the hub and the axle of each of the two bearings to increase the friction between the hub and the axle of each of the two bearings by provision of the pressing pieces and the pressing ribs of the friction member so that the user has to apply a larger force to overcome the friction between the hub and the axle of each of the two bearings so as to move the cart forward, thereby preventing the cart from being moved freely due to a slight touch or push by a person unintentionally.

According to another advantage of the present invention, when the moving force applied on the cart disappears, the cart stops moving immediately by action of the friction member so that the cart will not be moved freely and will not hit the user so as to protect the user's safety.

According to a further advantage of the present invention, the friction member has a noncircular limit section limited in the noncircular limit portion of the hub so that the friction member will not be rotated relative to the hub.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
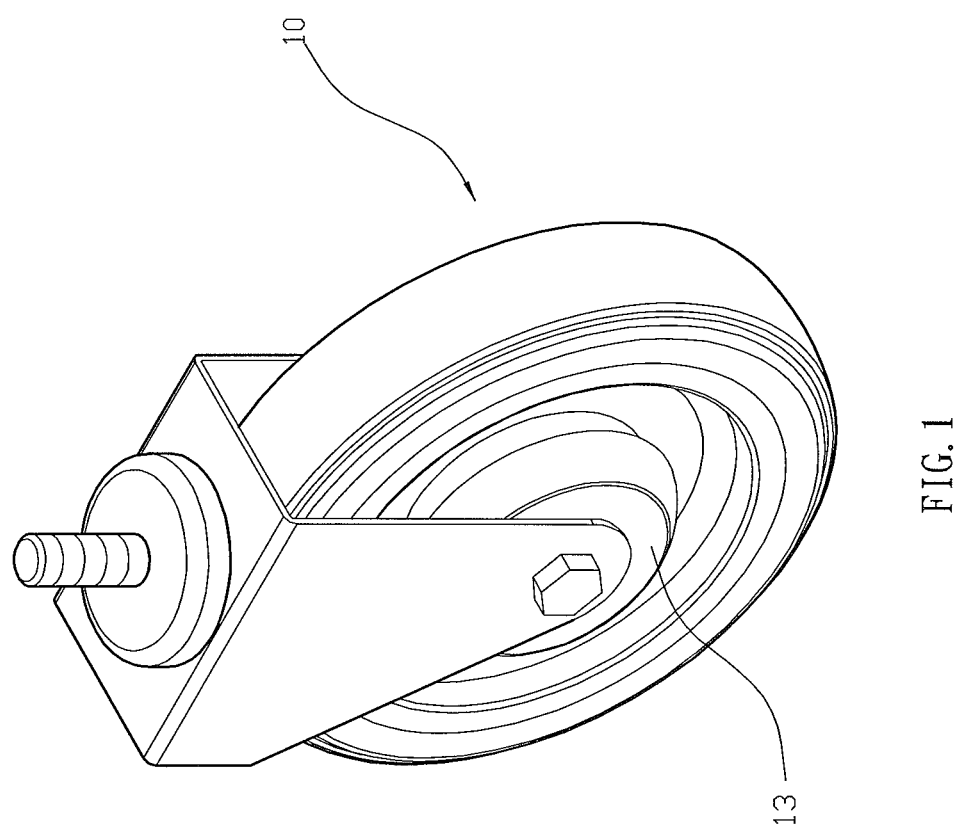
FIG. 1 is a perspective view of a friction wheel in accordance with the preferred embodiment of the present invention.
Figure 2:
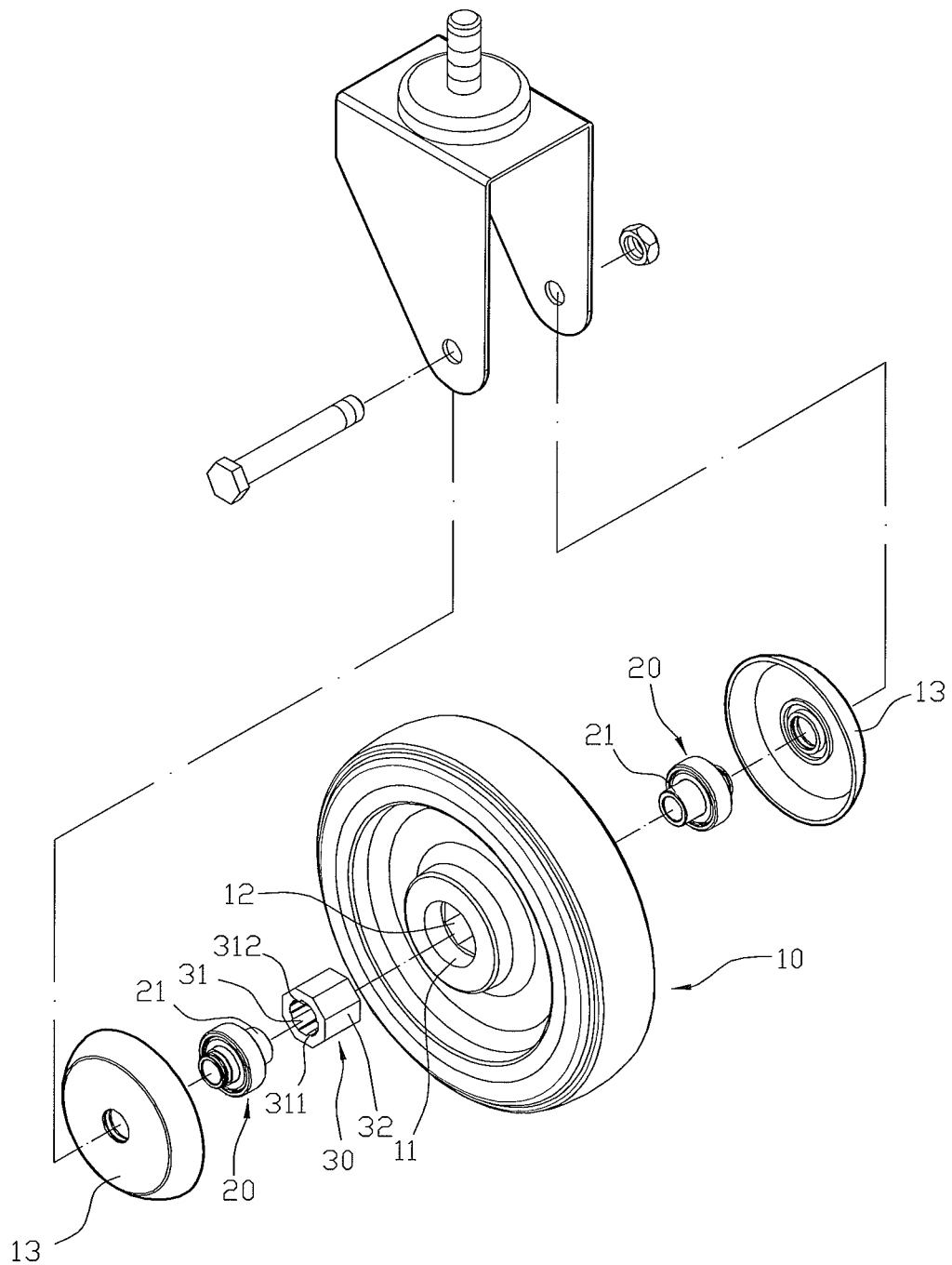
FIG. 2 is an exploded perspective view of the friction wheel as shown in FIG. 1.
Figure 3:
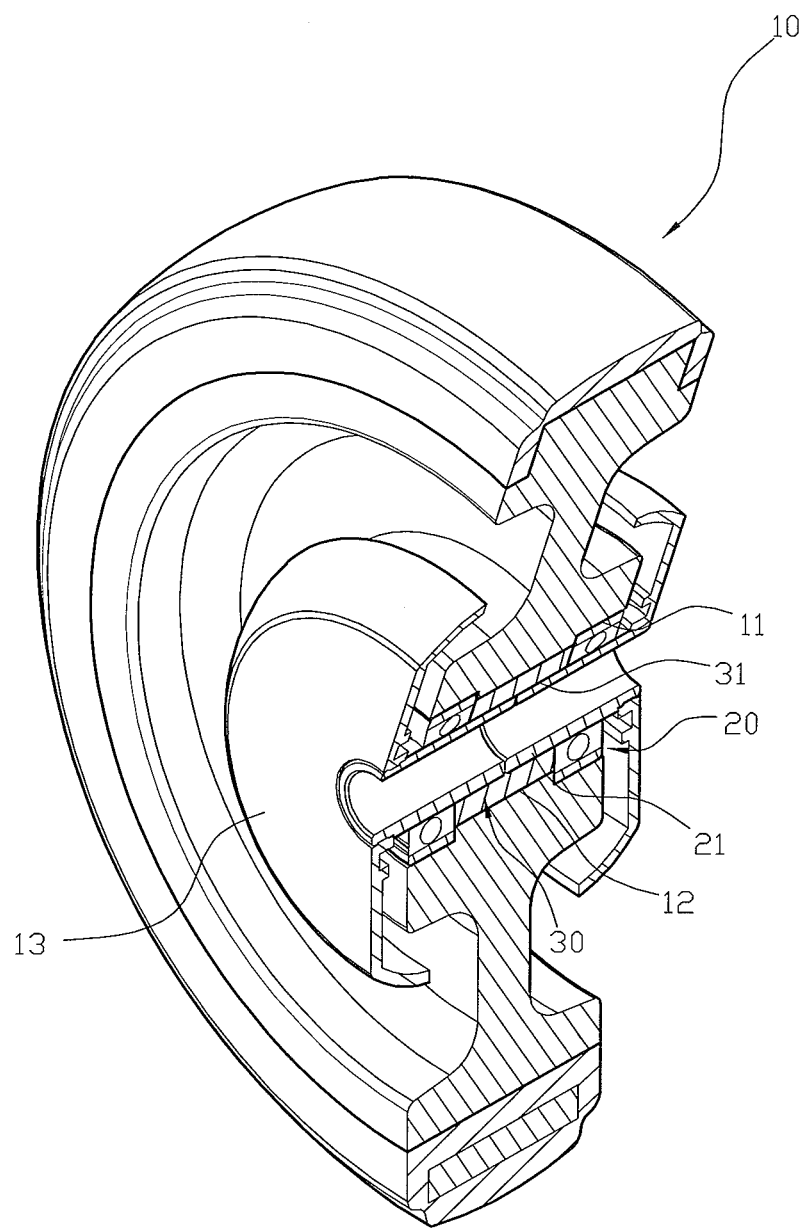
FIG. 3 is a perspective broken cross-sectional view of the friction wheel as shown in FIG. 1.
Figure 4:
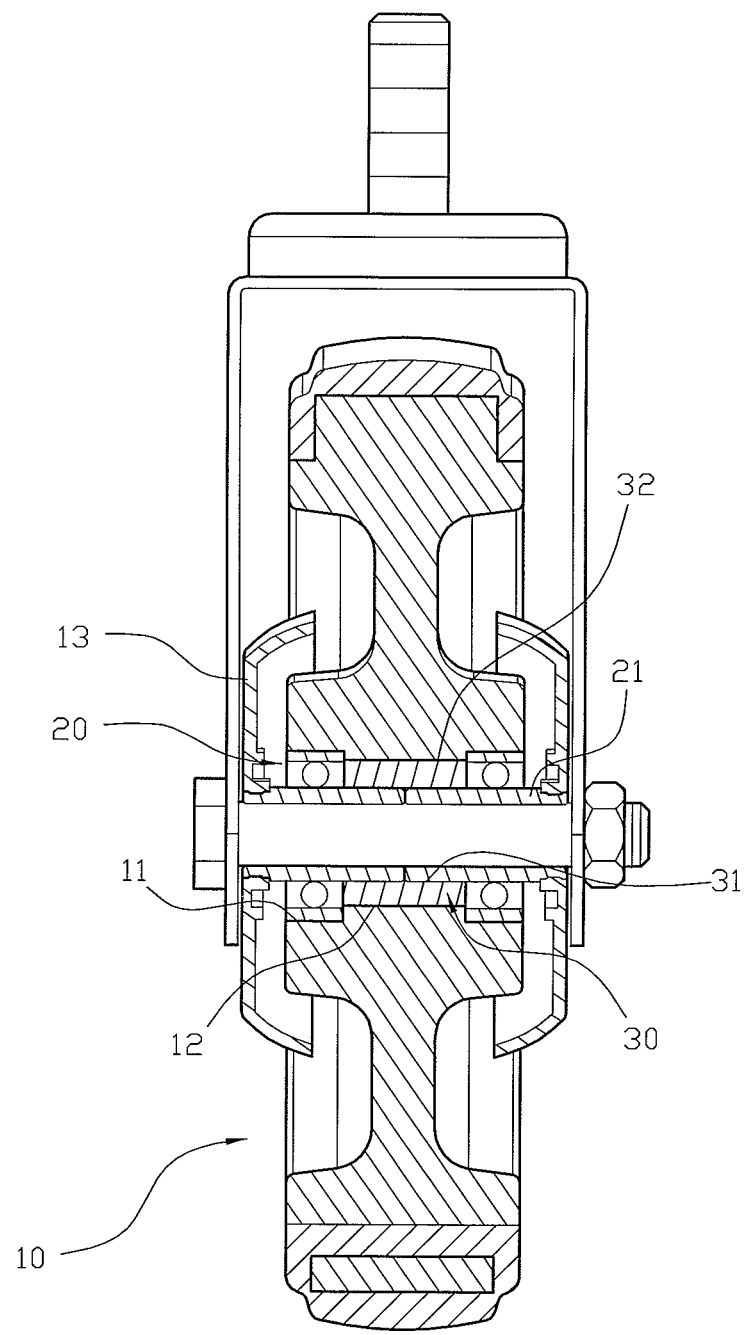
FIG. 4 is a side cross-sectional view of the friction wheel as shown in FIG. 1.
Figure 5:
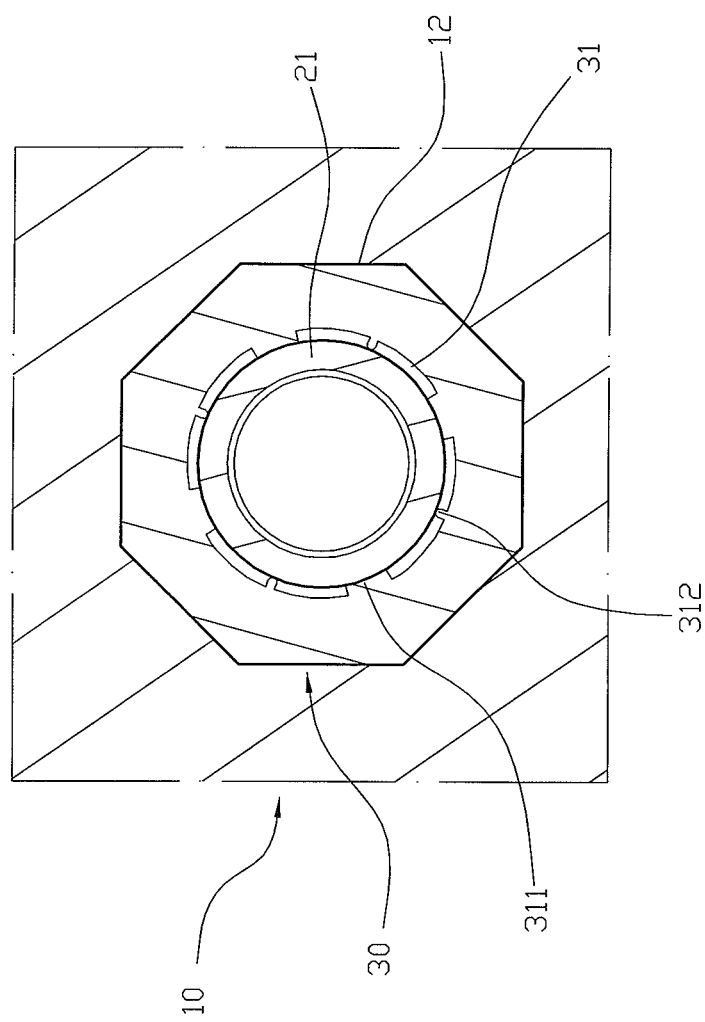
FIG. 5 is a partially front cross-sectional view of the friction wheel as shown in FIG. 1.

Referring to the drawings and initially to FIGS. 1-5, a friction wheel for a cart in accordance with the preferred embodiment of the present invention comprises a hub 10, two bearings 20 mounted in the hub 10 and each having an axle 21, a friction member 30 mounted between the hub 10 and the axle 21 of each of the two bearings 20, and two covers 13 mounted on the hub 10 to cover the two bearings 20 and the axle 21 of each of the two bearings 20.

The hub 10 has a central portion provided with a mounting hole 11 for mounting the friction member 30 and the two bearings 20. The mounting hole 11 of the hub 10 has a mediate portion provided with a noncircular limit portion 12 mounted on the friction member 30. The limit portion 12 of the hub 10 extends and protrudes radially and inwardly from a peripheral wall of the mounting hole 11.

The friction member 30 is inserted through the mounting hole 11 into the limit portion 12 of the hub 10 and is limited in the limit portion 12 of the hub 10. The friction member 30 has a periphery provided with a noncircular limit section 32 limited in the limit portion 12 of the hub 10 so that the friction member 30 is non-rotatable relative to and rotatable in concert with the hub 10. The friction member 30 is sandwiched between the two bearings 20. The friction member 30 has an interior provided with an axle hole 31 to receive the axle 21 of each of the two bearings 20. The axle hole 31 of the friction member 30 has a peripheral wall provided with a plurality of pressing pieces 311 abutting the axle 21 of each of the two bearings 20 and a plurality of pressing ribs 312 abutting the axle 21 of each of the two bearings 20.

The two bearings 20 are located at two opposite ends of the mounting hole 11 of the hub 10 and abut two opposite ends of the friction member 30. Each of the two bearings 20 is received in and flush with the mounting hole 11 of the hub 10. The axle 21 of each of the two bearings 20 has a periphery pressed by the pressing pieces 311 and the pressing ribs 312 of the friction member 30. The axle 21 of each of the two bearings 20 has a tubular shape and protrudes outward from two opposite ends of each of the two bearings 20. The axles 21 of the two bearings 20 are juxtaposed to each other. The axle 21 of each of the two bearings 20 has a first end inserted into the axle hole 31 of the friction member 30 and a second end inserted through a respective one of the two covers 13.

Figure 6:
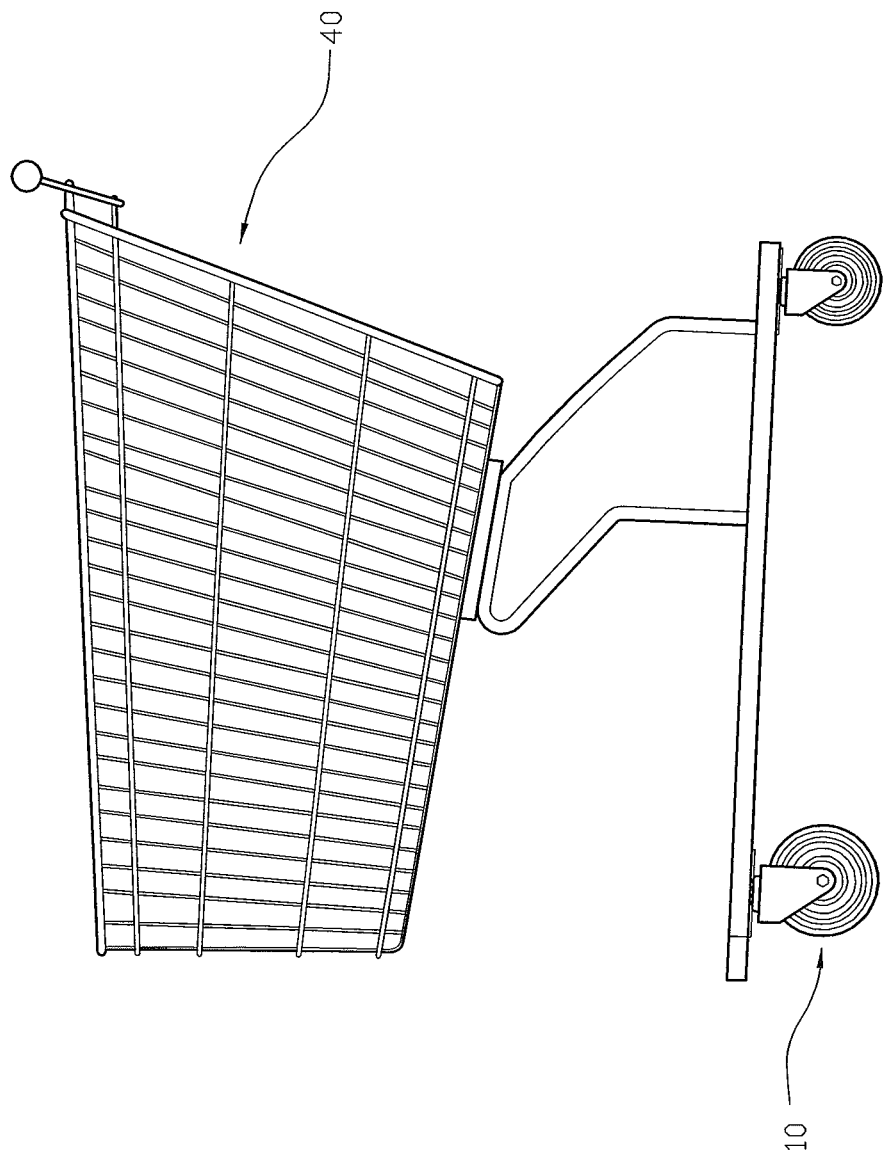
FIG. 6 is a schematic operational view of the friction wheel for a cart as shown in FIG. 1 in use.

In operation, referring to FIG. 6 with reference to FIGS. 1-5, the hub 10 of the friction wheel is mounted on the bottom of vehicle, such as a cart 40 and the like, to facilitate a user moving the cart 40. In such a manner, when the hub 10 is rotated with the cart 40, the friction member 30 is rotated in concert with the hub 10. At this time, the pressing pieces 311 and the pressing ribs 312 of the friction member 30 press the axle 21 of each of the two bearings 20 to increase the friction between the friction member 30 and the axle 21 of each of the two bearings 20 so that the user has to apply a larger force to overcome the friction between the friction member 30 and the axle 21 of each of the two bearings 20 so as to move the cart 40, thereby preventing the cart 40 from being moved freely due to a slight touch or push by a person unintentionally.

Accordingly, the friction member 30 is mounted between the hub 10 and the axle 21 of each of the two bearings 20 to increase the friction between the hub 10 and the axle 21 of each of the two bearings 20 by provision of the pressing pieces 311 and the pressing ribs 312 of the friction member 30 so that the user has to apply a larger force to overcome the friction between the hub 10 and the axle 21 of each of the two bearings 20 so as to move the cart 40 forward, thereby preventing the cart 40 from being moved freely due to a slight touch or push by a person unintentionally. In addition, when the moving force applied on the cart 40 disappears, the cart 40 stops moving immediately by action of the friction member 30 so that the cart 40 will not be moved freely and will not hit the user so as to protect the user's safety. Further, the friction member 30 has a noncircular limit section 32 limited in the noncircular limit portion 12 of the hub 10 so that the friction member 30 will not be rotated relative to the hub 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A friction wheel, comprising:
   a hub;
   two separate bearings, each of the bearings having an axle rotatably mounted therethrough; and
   a friction member having an axle hole receiving at least a portion of each said axle of the two bearings;
   wherein the hub has a central portion provided with a mounting hole for mounting the friction member and the two bearings;
   the mounting hole of the hub has a periphery provided with a protruding noncircular limit portion;
   the friction member has a periphery provided with a noncircular limit section inserted into and the mounting hole and secured with the limit portion of the mounting hole of the hub;
   the friction member is rotated in concert with the hub when the hub is rotated;
   an outer race of each of the two bearings is fixed to the hub and rotated when the hub and the friction member are rotated;
   the axle of each of the two bearings stay stationary when the hub and the friction member are rotated;
   the axle hole of the friction member has a peripheral wall provided with a plurality of pressing pieces abutting the axle of each of the two bearings and a plurality of pressing ribs abutting the axle of each of the two bearings.

2. The friction wheel of claim 1, wherein the friction wheel further comprises two covers mounted on the hub to cover the two bearings and the axle of each of the two bearings.

3. The friction wheel of claim 2, wherein the axle of each of the two bearings has a first end inserted into the axle hole of the friction member and a second end inserted through a respective one of the two covers.

4. The friction wheel of claim 1, wherein the friction member is inserted through the mounting hole into the limit portion of the hub.

5. The friction wheel of claim 1, wherein the friction member is sandwiched between the two bearings.

6. The friction wheel of claim 1, wherein the two bearings are located at two opposite ends of the mounting hole of the hub.

7. The friction wheel of claim 1, wherein the two bearings abut two opposite ends of the friction member.

8. The friction wheel of claim 1, wherein each of the two bearings is inserted in and is flush with the mounting hole of the hub.

9. The friction wheel of claim 1, wherein the axle of each of the two bearings has a periphery pressed by the pressing pieces and the pressing ribs of the friction member.

10. The friction wheel of claim 1, wherein the axle of each of the two bearings has a tubular shape.

11. The friction wheel of claim 1, wherein the axle of each of the two bearings protrudes outward from two opposite ends of each of the two bearings.

12. The friction wheel of claim 1, wherein the axles of the two bearings are juxtaposed to each other.

* * * * *